US008006019B2

(12) United States Patent
Laefer et al.

(10) Patent No.: US 8,006,019 B2

(45) **Date of Patent: *Aug. 23, 2011**

(54) METHOD AND SYSTEM FOR TRANSFERRING STORED DATA BETWEEN A MEDIA PLAYER AND AN ACCESSORY

(75) Inventors: Jay S. Laefer, San Mateo, CA (US); Scott Krueger, San Francisco, CA (US); Gregory Lydon, Santa Cruz, CA (US)

(73) Assignee: Apple, Inc., Cupertino, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 12/610,966

(22) Filed: Nov. 2, 2009

(65) Prior Publication Data

US 2010/0049350 A1 Feb. 25, 2010

Related U.S. Application Data

(63) Continuation of application No. 11/439,494, filed on May 22, 2006, now Pat. No. 7,634,605.

(51) Int. Cl.
*G06F 13/00* (2006.01)
*G06F 15/177* (2006.01)

(52) U.S. Cl. ....... 710/303; 710/35; 707/104.1; 709/220; 709/230; 345/169; 345/603; 345/46; 345/446; 345/454; 345/555; 345/558

(58) Field of Classification Search .................. 345/169, 345/603; 348/46, 446, 454, 555, 558; 386/45
See application file for complete search history.

(56) References Cited

U.S. PATENT DOCUMENTS

| | | | |
|---|---|---|---|
| 4,673,861 | A | 6/1987 | Dubovsky et al. |
| 4,850,899 | A | 7/1989 | Maynard |
| 4,916,334 | A | 4/1990 | Minagawa et al. |
| 4,924,216 | A | 5/1990 | Leung |
| 4,938,483 | A | 7/1990 | Yavetz |
| 5,041,025 | A | 8/1991 | Haitmanek |

(Continued)

FOREIGN PATENT DOCUMENTS

EP 1104150 A2 5/2001

(Continued)

OTHER PUBLICATIONS

Altec Lansing, "inMOTION Users Guide," Corp. Headquarters, 535 Rte.6 & 209, Milford, PA 18337.

(Continued)

*Primary Examiner* — Brian T Misiura

(74) *Attorney, Agent, or Firm* — Kilpatrick Townsend & Stockton LLP

(57) ABSTRACT

Techniques for transferring stored data between a media player and an accessory. In one set of embodiments, one of the media player and the accessory can obtain a unique identifier for a particular file stored in the other of the media player and the accessory. The one of the media player and the accessory can then retrieve data from the stored file using the unique identifier. In certain embodiments, accessories and media players can retrieve and store data utilizing an arbitrary format. This data can be opaque to any protocol used by the media player or accessory and can require no parsing or interpretation. To provide this facility, a plurality of commands can allow both media players and accessories to present a simple file system. The plurality of commands can be utilized in a variety of environments.

24 Claims, 11 Drawing Sheets

U.S. PATENT DOCUMENTS 5,051,606 A 9/1991 Ikehara
5,055,069 A 10/1991 Townsend et al.
5,080,603 A 1/1992 Mouissie
5,104,243 A 4/1992 Harding
5,108,313 A 4/1992 Adams
5,150,031 A 9/1992 James et al.
5,186,646 A 2/1993 Pederson
5,247,138 A 9/1993 Landmeier
5,277,624 A 1/1994 Champion
5,471,128 A 11/1995 Patino et al.
5,525,981 A 6/1996 Abernethy
5,586,893 A 12/1996 Mosquera
5,592,588 A 1/1997 Reekes et al.
5,618,045 A 4/1997 Kagan et al.
5,648,712 A 7/1997 Hahn
5,660,558 A 8/1997 Osanai et al.
5,675,467 A 10/1997 Nishimura et al.
5,727,866 A 3/1998 Kraines et al.
5,732,361 A 3/1998 Liu
5,754,027 A 5/1998 Oglesbee et al.
5,830,001 A 11/1998 Kinoshita
5,835,862 A 11/1998 Nykanen et al.
5,845,217 A 12/1998 Lindell et al.
5,859,522 A 1/1999 Theobald
5,884,323 A * 3/1999 Hawkins et al. ...................... 1/1
5,901,049 A 5/1999 Schmidt et al.
5,964,847 A 10/1999 Booth, III et al.
5,975,957 A 11/1999 Noda et al.
5,991,640 A 11/1999 Lilja et al.
6,007,372 A 12/1999 Wood
6,012,105 A 1/2000 Rubbmark et al.
6,031,797 A 2/2000 Van Ryzin et al.
6,053,773 A 4/2000 Wu
6,078,402 A 6/2000 Fischer et al.
6,078,789 A 6/2000 Bodenmann et al.
6,125,455 A 9/2000 Yeo
6,130,518 A 10/2000 Gabehart et al.
6,139,373 A 10/2000 Ward et al.
6,154,773 A 11/2000 Roberts et al.
6,154,798 A 11/2000 Lin et al.
6,161,027 A 12/2000 Poirel
6,169,387 B1 1/2001 Kaib
6,175,358 B1 1/2001 Scott-Jackson et al.
6,178,514 B1 1/2001 Wood
6,184,652 B1 2/2001 Yang
6,184,655 B1 2/2001 Malackowski
6,188,265 B1 2/2001 Liu et al.
6,203,345 B1 3/2001 Roque et al.
6,204,637 B1 3/2001 Rengan
6,206,480 B1 3/2001 Thompson
6,211,581 B1 4/2001 Farrant
6,211,649 B1 4/2001 Matsuda
6,224,420 B1 5/2001 Nishio et al.
6,230,205 B1 5/2001 Garrity et al.
6,234,827 B1 5/2001 Nishio et al.
6,236,395 B1 5/2001 Sezan et al.
6,252,380 B1 6/2001 Koenck
6,261,109 B1 7/2001 Liu et al.
6,262,723 B1 7/2001 Matsuawa et al.
6,267,623 B1 7/2001 Hisamatsu
6,268,845 B1 7/2001 Pariza et al.
6,271,605 B1 8/2001 Carkner et al.
6,272,328 B1 8/2001 Nguyen et al.
6,280,251 B1 8/2001 Nishio et al.
6,283,789 B1 9/2001 Tsai
6,304,764 B1 10/2001 Pan
6,314,479 B1 11/2001 Frederick et al.
6,316,916 B2 11/2001 Bohne
6,319,061 B1 11/2001 Chen et al.
6,322,396 B1 11/2001 Kuan
6,344,727 B1 2/2002 Desai et al.
6,353,894 B1 3/2002 Pione
6,354,713 B1 3/2002 Leifer et al.
6,358,089 B1 3/2002 Kuroda et al.
6,372,974 B1 4/2002 Gross et al.
6,377,825 B1 4/2002 Kennedy et al.
6,385,596 B1 5/2002 Wiser et al.
6,394,905 B1 5/2002 Takeda et al.
6,418,421 B1 7/2002 Hurtado et al.
6,429,622 B1 8/2002 Svensson
6,429,879 B1 8/2002 Sturgeon et al.
6,431,915 B1 8/2002 Ko
6,453,371 B1 9/2002 Hampson et al.
6,454,592 B2 9/2002 Takagi
6,461,173 B1 10/2002 Mizuno et al.
6,464,542 B1 10/2002 Lee
6,468,110 B2 10/2002 Fujino et al.
6,476,825 B1 11/2002 Croy et al.
6,478,603 B1 11/2002 Wu
6,483,428 B1 11/2002 Fish et al.
6,485,328 B1 11/2002 Wu
6,489,751 B2 12/2002 Small et al.
6,501,441 B1 12/2002 Ludtke et al.
6,505,160 B1 1/2003 Levy et al.
6,524,119 B2 2/2003 Kato et al.
6,526,287 B1 2/2003 Lee
6,535,981 B1 3/2003 Shimizu
6,558,201 B1 5/2003 Begley et al.
6,577,877 B1 6/2003 Charlier et al.
6,589,076 B1 7/2003 Davis et al.
6,591,085 B1 7/2003 Grady
6,608,264 B1 8/2003 Fouladpour
6,608,399 B2 8/2003 McConnell et al.
6,614,232 B1 9/2003 Mukai
6,616,473 B2 9/2003 Kamata et al.
6,629,197 B1 9/2003 Bhogal et al.
6,642,629 B2 11/2003 DeLeeuw
6,643,777 B1 11/2003 Chu
6,651,138 B2 11/2003 Lai et al.
6,653,813 B2 11/2003 Khatri
6,663,420 B1 12/2003 Xiao
6,665,803 B2 12/2003 Lunsford et al.
6,670,997 B1 12/2003 Northrup
6,674,995 B1 1/2004 Meyers et al.
6,687,454 B1 2/2004 Kuroiwa
6,697,944 B1 2/2004 Jones et al.
6,708,283 B1 3/2004 Nelvin et al.
6,724,339 B2 4/2004 Conway et al.
6,725,061 B1 4/2004 Hutchison, IV et al.
6,728,546 B1 4/2004 Peterson et al.
6,728,729 B1 4/2004 Jawa et al.
6,747,859 B2 6/2004 Walbeck et al.
6,754,468 B1 6/2004 Sieben et al.
6,761,635 B2 7/2004 Hoshino et al.
6,774,939 B1 8/2004 Peng
6,776,626 B2 8/2004 Huang et al.
6,776,660 B1 8/2004 Kubota et al.
6,776,665 B2 8/2004 Huang
6,799,226 B1 9/2004 Robbin et al.
6,801,964 B1 10/2004 Mahdavi
6,813,528 B1 11/2004 Yang
6,816,376 B2 11/2004 Bright et al.
6,830,160 B2 12/2004 Risolia
6,859,538 B1 2/2005 Voltz
6,859,854 B2 2/2005 Kwong
6,879,843 B1 4/2005 Kim
6,928,295 B2 8/2005 Olson et al.
6,931,266 B2 8/2005 Miyoshi et al.
6,931,456 B2 8/2005 Payne et al.
6,939,177 B2 9/2005 Kato et al.
6,944,704 B2 9/2005 Brelin
6,991,483 B1 1/2006 Milan et al.
7,004,787 B2 2/2006 Milan
7,006,793 B2 2/2006 Himmel et al.
7,013,164 B2 3/2006 Lin
7,040,919 B2 5/2006 Yao
7,050,783 B2 5/2006 Curtiss et al.
7,054,888 B2 5/2006 LaChapelle et al.
7,062,261 B2 6/2006 Goldstein et al.
7,108,560 B1 9/2006 Chou et al.
7,120,462 B2 10/2006 Kumar
7,127,678 B2 10/2006 Bhesania et al.
7,127,879 B2 10/2006 Zhu et al.
7,149,543 B2 12/2006 Kumar
7,155,545 B1 12/2006 Wang
7,167,112 B2 1/2007 Andersen et al.
7,167,935 B2 1/2007 Hellberg 7,187,947 B1 3/2007 White et al.
7,187,948 B2 3/2007 Alden
7,215,042 B2 5/2007 Yan
7,281,214 B2 10/2007 Fadell
7,293,122 B1 11/2007 Schubert et al.
7,293,227 B2 11/2007 Plastina et al.
7,299,304 B2 11/2007 Saint-Hilaire et al.
7,303,282 B2 12/2007 Dwyer et al.
7,304,685 B2 12/2007 Park et al.
7,305,254 B2 12/2007 Findikli
7,305,506 B1 12/2007 Lydon et al.
7,362,963 B2 4/2008 Lin
7,363,129 B1 4/2008 Barnicle et al.
7,391,963 B2 6/2008 Chen et al.
7,415,563 B1 8/2008 Holden et al.
7,441,058 B1 10/2008 Bolton et al.
7,441,062 B2 10/2008 Novotney et al.
7,444,388 B1 10/2008 Svendsen
7,450,961 B1 11/2008 Heubel et al.
7,454,019 B2 11/2008 Williams
7,493,645 B1 2/2009 Tranchina
7,526,588 B1 4/2009 Schubert et al.
7,529,870 B1 5/2009 Schubert et al.
7,529,871 B1 5/2009 Schubert et al.
7,529,872 B1 5/2009 Schubert et al.
7,558,894 B1 7/2009 Lydon et al.
7,587,540 B2 9/2009 Novotney et al.
7,590,783 B2 9/2009 Lydon et al.
7,610,350 B2 10/2009 Abdulrahiman et al.
7,634,605 B2 12/2009 Laefer et al.
7,660,929 B2 2/2010 Novotney et al.
7,670,263 B2 3/2010 Ellis et al.
7,673,020 B2 3/2010 Rosenbloom et al.
7,673,083 B2 3/2010 Laefer et al.
7,757,026 B2 7/2010 Novotney et al.
7,779,185 B2 8/2010 Schubert et al.
7,791,319 B2 9/2010 Veselic et al.
7,797,471 B2 9/2010 Laefer et al.
7,853,746 B2 12/2010 Novotney et al.
7,877,532 B2 1/2011 Schubert et al.
2001/0003205 A1 6/2001 Gilbert
2001/0005641 A1 6/2001 Matsumoto et al.
2001/0006884 A1 7/2001 Matsumoto
2002/0002035 A1 1/2002 Sim et al.
2002/0010759 A1 1/2002 Hitson et al.
2002/0015362 A1 2/2002 Cowgill et al.
2002/0029303 A1 3/2002 Nguyen
2002/0065074 A1 5/2002 Cohn et al.
2002/0068610 A1 6/2002 Anvekar et al.
2002/0072390 A1 6/2002 Uchiyama
2002/0103008 A1 8/2002 Rahn et al.
2002/0105861 A1 8/2002 Leapman
2002/0108108 A1 8/2002 Akaiwa et al.
2002/0115480 A1 8/2002 Huang
2002/0116533 A1 8/2002 Holliman et al.
2002/0120850 A1 8/2002 Walker et al.
2002/0132651 A1 9/2002 Jinnouchi
2002/0151327 A1 10/2002 Levitt
2002/0152874 A1 10/2002 Vilcauskas et al.
2002/0156546 A1 10/2002 Ramaswamy
2002/0156949 A1 10/2002 Kubo et al.
2002/0173273 A1 11/2002 Spurgat et al.
2002/0174269 A1 11/2002 Spurgat et al.
2002/0194621 A1 12/2002 Tran et al.
2003/0004934 A1 1/2003 Qian
2003/0011608 A1 1/2003 Wada
2003/0028664 A1 2/2003 Tan et al.
2003/0041206 A1 2/2003 Dickie
2003/0059022 A1 3/2003 Nebiker et al.
2003/0067741 A1 4/2003 Alfonso et al.
2003/0073432 A1 4/2003 Meade
2003/0079038 A1 4/2003 Robbin et al.
2003/0090988 A1 5/2003 Sun et al.
2003/0090998 A1 5/2003 Lee et al.
2003/0097379 A1 5/2003 Ireton
2003/0110403 A1 6/2003 Crutchfield et al.
2003/0151621 A1 8/2003 McEvilly et al.
2003/0167318 A1 9/2003 Robbin et al.
2003/0172209 A1 9/2003 Liu et al.
2003/0185395 A1 10/2003 Lee et al.
2003/0198015 A1 10/2003 Vogt
2003/0212895 A1 11/2003 Kisliakiv
2003/0215102 A1 11/2003 Marlowe
2003/0220988 A1 11/2003 Hymel
2003/0236075 A1 12/2003 Johnson et al.
2003/0237043 A1 12/2003 Novak et al.
2004/0003300 A1 1/2004 Malueg et al.
2004/0019497 A1 1/2004 Volk et al.
2004/0039860 A1 2/2004 Mills et al.
2004/0048569 A1 3/2004 Kawamura
2004/0090998 A1 5/2004 Chen
2004/0103223 A1 5/2004 Gabehart et al.
2004/0116005 A1 6/2004 Choi
2004/0151327 A1 8/2004 Marlow
2004/0162029 A1 8/2004 Grady
2004/0164708 A1 8/2004 Veselic et al.
2004/0186935 A1 9/2004 Bel et al.
2004/0194154 A1 9/2004 Meadors et al.
2004/0198436 A1 10/2004 Alden
2004/0224638 A1 11/2004 Fadell et al.
2004/0235339 A1 11/2004 Sato et al.
2004/0249994 A1 12/2004 Shapiro et al.
2004/0252966 A1 12/2004 Holloway et al.
2004/0267812 A1 12/2004 Harris et al.
2004/0267825 A1 12/2004 Novak et al.
2004/0268397 A1 12/2004 Dunbar et al.
2005/0001589 A1 1/2005 Edington
2005/0014119 A1 1/2005 Rudakov
2005/0014531 A1 1/2005 Findikli
2005/0014536 A1 1/2005 Grady
2005/0015355 A1 1/2005 Heller et al.
2005/0018768 A1 1/2005 Mabey et al.
2005/0022212 A1 1/2005 Bowen
2005/0047071 A1 3/2005 Tse Chun Hin
2005/0135790 A1 6/2005 Hutten
2005/0138433 A1 6/2005 Linetsky
2005/0149213 A1 7/2005 Guzak et al.
2005/0181756 A1 8/2005 Lin
2005/0198189 A1 9/2005 Robinson et al.
2005/0207726 A1 9/2005 Chen
2005/0227612 A1 10/2005 Helstrom et al.
2005/0239333 A1 10/2005 Watanabe et al.
2005/0240705 A1 10/2005 Novotney et al.
2005/0246375 A1 11/2005 Manders et al.
2005/0251565 A1* 11/2005 Weel ............................ 709/219
2005/0281185 A1 12/2005 Kawasaki
2006/0015826 A1 1/2006 Shiozawa et al.
2006/0031545 A1 2/2006 Manders et al.
2006/0056796 A1 3/2006 Nishizawa et al.
2006/0088228 A1 4/2006 Marriott et al.
2006/0116009 A1 6/2006 Langberg et al.
2006/0143680 A1 6/2006 Adachi
2006/0156415 A1 7/2006 Rubinstein et al.
2006/0161621 A1 7/2006 Rosenberg
2006/0163358 A1 7/2006 Biderman
2006/0168298 A1 7/2006 Aoki et al.
2006/0184456 A1 8/2006 de Janasz
2006/0188237 A1 8/2006 Watanabe et al.
2006/0224620 A1 10/2006 Silverman et al.
2006/0236245 A1 10/2006 Agarwal et al.
2006/0247851 A1 11/2006 Morris
2006/0258289 A1 11/2006 Dua
2006/0294209 A1 12/2006 Rosenbloom et al.
2007/0018947 A1 1/2007 Toro-Lira
2007/0056012 A1 3/2007 Kwon et al.
2007/0056013 A1 3/2007 Duncan
2007/0070856 A1 3/2007 Tebele
2007/0080823 A1 4/2007 Fu et al.
2007/0083814 A1 4/2007 Wilbrink et al.
2007/0086724 A1 4/2007 Grady et al.
2007/0106760 A1 5/2007 Houh et al.
2007/0130592 A1 6/2007 Haeusel
2007/0173197 A1 7/2007 Hsiung
2007/0173294 A1 7/2007 Hsiung
2007/0206827 A1 9/2007 Tupman et al.
2007/0226238 A1 9/2007 Kiilerich et al.
2007/0226384 A1 9/2007 Robbin et al.
2007/0233294 A1 10/2007 Holden et al.

| | | | | |
|---|---|---|---|---|
| 2007/0233295 | A1 | 10/2007 | Laefer et al. | |
| 2007/0234420 | A1 | 10/2007 | Novotney et al. | |
| 2007/0236482 | A1 | 10/2007 | Proctor et al. | |
| 2007/0247794 | A1 | 10/2007 | Jaffe et al. | |
| 2007/0300155 | A1 | 12/2007 | Laefer et al. | |
| 2008/0025172 | A1 | 1/2008 | Holden et al. | |
| 2008/0034325 | A1 | 2/2008 | Ording | |
| 2008/0055272 | A1 | 3/2008 | Anzures et al. | |
| 2008/0065722 | A1 | 3/2008 | Brodersen et al. | |
| 2008/0188209 | A1* | 8/2008 | Dorogusker et al. | 455/414.2 |
| 2009/0013096 | A1 | 1/2009 | Novotney et al. | |
| 2009/0013110 | A1 | 1/2009 | Novotney et al. | |
| 2009/0013253 | A1 | 1/2009 | Laefer et al. | |
| 2009/0125134 | A1 | 5/2009 | Bolton et al. | |
| 2009/0132076 | A1 | 5/2009 | Holden et al. | |
| 2009/0198361 | A1 | 8/2009 | Schubert et al. | |
| 2009/0204244 | A1 | 8/2009 | Schubert et al. | |
| 2009/0204738 | A1 | 8/2009 | Schubert et al. | |
| 2009/0210079 | A1 | 8/2009 | Schubert et al. | |
| 2009/0249101 | A1 | 10/2009 | Lydon et al. | |
| 2009/0292835 | A1 | 11/2009 | Novotney et al. | |
| 2009/0299506 | A1 | 12/2009 | Lydon et al. | |
| 2010/0049350 | A1 | 2/2010 | Laefer et al. | |
| 2010/0106879 | A1 | 4/2010 | Laefer et al. | |

FOREIGN PATENT DOCUMENTS

| | | | |
|---|---|---|---|
| EP | 1150472 | A2 | 10/2001 |
| EP | 1367734 | A1 | 12/2003 |
| EP | 1498899 | A1 | 1/2005 |
| EP | 1594319 | A1 | 11/2005 |
| EP | 1672613 | A2 | 6/2006 |
| GB | 2405718 | A | 3/2005 |
| JP | 07-176351 | A | 7/1995 |
| JP | 10-321302 | A | 4/1998 |
| JP | 10-334993 | A | 12/1998 |
| JP | 11-288420 | A | 10/1999 |
| JP | 2000-214953 | A | 8/2000 |
| JP | 2000-223215 | A | 8/2000 |
| JP | 2000-223216 | A | 8/2000 |
| JP | 2000-223218 | A | 8/2000 |
| JP | 2001-035603 | A | 2/2001 |
| JP | 2001-069165 | A | 3/2001 |
| JP | 2001-196133 | A | 7/2001 |
| JP | 2001-230021 | A | 8/2001 |
| JP | 2001-332350 | A | 11/2001 |
| JP | 2002-025720 | A | 1/2002 |
| JP | 2002-203641 | A | 7/2002 |
| JP | 2002-245719 | A | 8/2002 |
| JP | 2002-252566 | A | 9/2002 |
| JP | 3090747 | U | 10/2002 |
| JP | 2002-342659 | A | 11/2002 |
| JP | 2002-374447 A | A | 12/2002 |
| JP | 2003-017165 | A | 1/2003 |
| JP | 2003-032351 | A | 1/2003 |
| JP | 2003-274386 | A | 9/2003 |
| JP | 2008071419 | A | 3/2007 |
| JP | 2008053955 | A | 3/2008 |
| JP | 2009303001 | A | 12/2009 |
| TW | 530267 | | 5/2003 |
| WO | WO 99/26330 | | 5/1999 |
| WO | WO 03/056776 | A1 | 9/1999 |
| WO | WO 00/39907 | | 7/2000 |
| WO | WO 00/60450 | A1 | 10/2000 |
| WO | WO 02/49314 | | 6/2002 |
| WO | WO 03/036541 | A1 | 5/2003 |
| WO | WO 03/036957 | A1 | 5/2003 |
| WO | WO 99/48089 | A2 | 7/2003 |
| WO | WO 03/073688 | | 9/2003 |
| WO | WO 2004/084413 | A2 | 9/2004 |
| WO | WO 2004/112311 | A1 | 12/2004 |
| WO | WO 2005/119463 | A2 | 12/2005 |
| WO | WO 2006/073702 | A1 | 7/2006 |
| WO | WO 2006/080957 | A2 | 8/2006 |

OTHER PUBLICATIONS

Anonymous, "Future of Digital Music in Windows," Microsoft Windows Hardware Developer Central Archive, Dec. 4, 2001[Online], [retrieved on Jan. 15, 2008]. <URL:http://www.microsoft.com/whdc/archive/digitaudio.mspx> 3 pages.

Anonymous, "Introduction to Digital Audio," Microsoft Windows Hardware Developer Central Archive, Dec. 4, 2001 [Online], [retrieved on Jan. 15, 2008]. <URL:http://www.microsoft.com/whdc/archive/digitaudio.mspx> 2 pages.

Anonymous, "Windows and Red Book Audio," Microsoft Windows Hardware Developer Central Archive, Dec. 4, 2001 [Online], [retrieved Jan. 15, 2008]. <URL:http://www.microsoft.com/whdc/archive/Dmfuture.mspx> 2 pages.

"A Serial Bus on Speed Diagram: Getting Connected with FireWire," downloaded Oct. 16, 2001, PC Magazine: PC Tech (A Serial Bus on Speed) wysiwyg://51http://www.zdnet.com/pctech/content/18/10/tu1810.007.html p. 7.

Belkin iPod Voice Recorder, Product Specification Sheet, printed Jun. 16, 2004.

Bindra, "Standard Turns Monitor into I/O Hub," Electronic Engineering Times, vol. 918, Sep. 6, 1996, p. 14.

Brentrup, "Introduction to Public Key Cryptography Demystified," Campus Technology, printed from http://www.campus-technology.com/article.asp?id=7626 on Oct. 6, 2004.

Brown, "Making USB Work," downloaded Oct. 16, 2001, PC Magazine: PC Tech wysiwyg:/155/http://www.zdnet.com/pcmag/pctech/content!18/04/tu1804.001.html.

"Cables to Go," download Oct. 16, 2001 http://www.cablestogo.com/product.asp?cat%5Fid=601&sku=27028.

Crawford et al., "Sample rate conversion and bit rate reduction in the studio," IEEE Colloquium on Digital Audio Signal Processing, May 22, 1991, pp. 8/1-8/3.

Derman, "Monitors Make Net Connections," Electronic Engineering Times, vol. 933, 1996, pp. 60 and 69.

"ExpressBus™ F5U0I0," User Guide Packing Checklist, Belkin Components Product Warranty.

"FireWire", downloaded Oct. 16, 2001; si_wyg:/ /4 2/http://developer.apple. com/hardware/Fire_Wire.

"Fire Wire Connector," downloaded Oct. 16, 2001, wysiwyg://76/http://developer.apple.com/...es/Macintosh_CPUs-G3/ibook/ibook-27.html.

Fried, "FireWire poised to become ubiquitous," downloaded Oct. 16, 2001, CNET News.com, 1394 Trade Association: Press, wysiwyg:/132/http:/_113_94ta.org/Press/200_1_Press/august!8.2 7. b.html.

Fried, "New Fire Wire to blaze faster trail," downloaded Oct. 16, 2001, CNET News.com, http://news.cnet.com/news/0-I006-200-6021210.html.

"How to Connect Your Computer PC Hardware", downloaded Oct. 16, 2001, http:///www.scar.utoronto.ca!~ccweb/faculty/connect-howto.html.

"IEEE 1394/USB Comparison," downloaded Oct. 16, 2001, www.genitech.com.aulLIBRARY/TechSupportiinfobits/firewirevsusb.html.

"Introduction to Public Key Cryptography," Oct. 9, 1998, printed from http://developer.netscape.com/docs/manuals/security/pkin/contents.html on Oct. 6, 2004.

iPod Classic User's Guide, acquired from apple.com, 2002; 44 pages.

iPod nano Features Guide, acquired from apple.com, 2008; 72 pages.

iPod touch User's Guide, acquired from apple.com, 2008, 120 pages.

"iPodDock/iPod Cradle," www.bookendzdocks.com/bookendz/dock_cradle.html, downloaded Feb. 27, 2003.

Lambert, "Digital Audio Interfaces," Journal of the Audio Engineering Society, Audio Engineering Society, New York, NY, vol. 38, No. 9, (Sep. 1, 1990), pp. 681-684, 686, 688, 690, 692 and 696, XP000175146 ISSN: 1549-4950 figures 9, 10.

Lewis, "On Technology" Fortune Magazine, Dec. 9, 2002, p. 240.

MAXTech Technology Ltd., CES 2000/Las Vegas, Jan. 6-9, 2000, [on line], [retrieved on Sep. 26, 2008]. Retrieved from the Internet <URL: http://web.archive.org/web/20000930170634/www.maxtech.com.hk/t-details.htm>. 2 pages.

MAXTech Technology Ltd., CES 2000/Las Vegas, Jan. 6-9, 2000, [online], [retrieved on Sep. 23, 2008]. Retrieved from the Internet <URL: http://web.archive.org/web/20010223230441/www.maxtech.com.hk/g-p06.htm>. 2 pages.

Menezes et al., "Handbook of Applied Cryptography," *Identification and Entity Authentication,* pp. 385-424.
Microsoft, "Media Transport Protocol Implementation Details," 2005, 18 pages.
"MPV™ Music Profile Specification Revision 1.00" Internet Citation [online] (Jan. 7, 2004) URL:http//www.osta.org/mpv/public/specs/MPVMusic-Prof-Spec-1.00.pdf> [retrieved Jun. 20, 2006] the whole document, 70 pages.
Networking Tech Note, "1394 Standards and Specifications," 3 pgs.
"Neuros MP3 Digital Audio Computer," www.neurosaudio.com, downloaded Apr. 9, 2003, 6 pages.
"PMC FW2 IEEE1394 FireWire Controller", downloaded Oct. 16, 2001, http://www.bvmltd.co.uk/PMCfw2ds.html.
Severance, "FireWire Finally Comes Home," Michigan State University, Standards, Nov. 1998, pp. 117-118.
Sinitsyn, "Synchronization Framework for Personal Mobile Servers," Pervasive Computing and Communications Workshops (PERCOMW'04), Proceedings of the Second IEEE Annual Conference, Piscataway, NJ, USA, IEEE, Mar. 14, 2004, pp. 208-212.
Teener, "Understanding Fire Wire: The IEEE 1394 Standards and Specifications," downloaded Oct. 16, 2001, wysiwyg:119/http:1_lwww.chipcenter.com/networking/ieee_1394/main.html.
"The Authoritative Dictionary of IEEE Standards Terms, Seventh Edition," Published by Standards Information Network, IEEE Press, 2000, 3 pages.
"Universal Serial Bus Specification—Rev 2.0," *Chapter 6: Compaq Hewlett-Packard,* Apr. 27, 2000, pp. 85, 99-100.
"Universal Serial Bus Specification—Rev 2.0," XP002474828, *Chapter 9: USB Device Framework,* pp. 239-274.
Vitaliano, "Why FireWire is Hot!Hot!Hot!" downloaded Oct. 16, 2001, "Impact.FireWire.SideBar" http://www.vxm.com/21R.35.html.
Whittle, "Public Key Authentication Framework: Tutorial," First Principles Consulting, Jun. 2, 1996, downloaded Oct. 6, 2004, http://www.ozemail.com.au/~firstpr/crypto/pkaftute.htm, 8 pages.
Chen et al., "Design and Implementation of a Hard Disk-Based Entertainment Device for Managing Media Contents on the Go," Consumer Electronics, 1005. (ISCE 2005). Proceedings of the Ninth International Symposium on, pp. 328-333, Jun. 14-16, 2005.
LSI Logic's Broadcast PC Card Brings New Multimedia Capabilities to Personal Computing. (Nov. 16). PR Newswire, 1. Retrieved Jun. 26, 2010, from Business Dateline.
Nomad II Player Version 1.0 (CLI) (User's Manual), Creative Technology, Ltd., Jan. 2000.
Slay et al., "iPod Forensics: Forensically Sound Examination of an Apple iPod," *System Sciences,* 2007. HICSS 2007. 40th Annual Hawaii Internation Conference on, pp. 1-9, Jan. 2007.

* cited by examiner

| Pin | Signal name | I/O | Function |
|---|---|---|---|
| 1 | DGND | I | Digital ground |
| 2 | DGND | I | Digital ground |
| 3 | TPA+ | I/O | Firewire signal |
| 4 | USB D+ | I/O | USB signal |
| 5 | TPA- | I/O | Firewire signal |
| 6 | USB D- | I/O | USB signal |
| 7 | TPB+ | I/O | Firewire signal |
| 8 | USB PWR | I | USB power in. NOT for powering; only to detect USB host |
| 9 | TPB- | I/O | Firewire signal |
| 10 | Accessory Identify | I | Pull down in dock to notify iPod of specific device |
| 11 | F/W PWR+ | I | Firewire and charger input power (8V to 30V dc) |
| 12 | F/W PWR+ | I | Firewire and charger input power (8V to 30V dc) |
| 13 | ACCESSORY PWR(3V3) | O | 3.3V output from iPod. Current limited to 100mA. |
| 14 | Reserved | | |
| 15 | DGND | GND | Digital ground in iPod |
| 16 | DGND | GND | Digital ground in iPod |
| 17 | Reserved | | |
| 18 | Dock Tx | I | Serial protocol (Data to iPod) |
| 19 | Dock Rx | O | Serial protocol (Data from iPod) |
| 20 | Accessory Detect | I/O | |
| 21 | S Video Y | O | Luminance component |
| 22 | S Video C | O | Chrominance component |
| 23 | Video Composite | O | Composite signal |
| 24 | Remote Sense | I | Detect remote |
| 25 | LINE-IN L | I | Line level input to the iPod for the left channel |
| 26 | LINE-IN R | I | Line level input to the iPod for the right channel |
| 27 | LINE-OUT L | O | Line level output to the iPod for the left channel |
| 28 | LINE-OUT R | O | Line level output to the iPod for the right channel |
| 29 | Audio Return | GND | Audio return - Signal, never to be grounded inside accessory |
| 30 | DGND | GND | Digital ground iPod |
| 31 | Chassis | | Chassis ground for connector shell |
| 32 | Chassis | | Chassis ground for connector shell |

FIG. 3A

| Pin | Signal name | I/O | Function |
|---|---|---|---|
| 1 | Audio Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Composite Video | O | Video signal |
| 6 | Accessory 3.3V | O | 3.3V Accessory power 100mA max |
| 7 | Tx | O | Serial protocol (Data from iPod to Device) |
| 8 | Rx | I | Serial protocol (Data to iPod from Device) |
| 9 | D GND | GND | Digital ground for accessory |

FIG. 3B

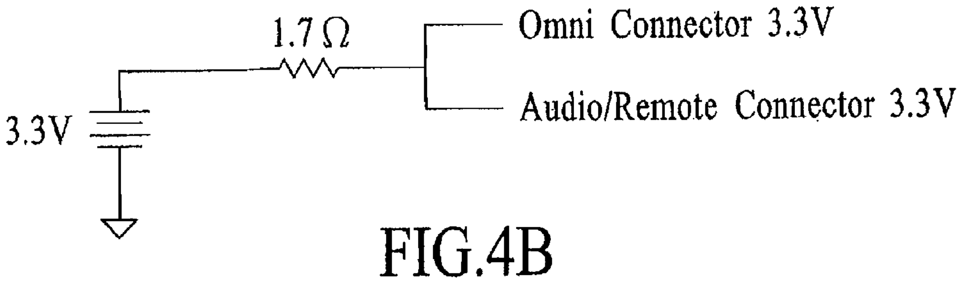

FIG.4B

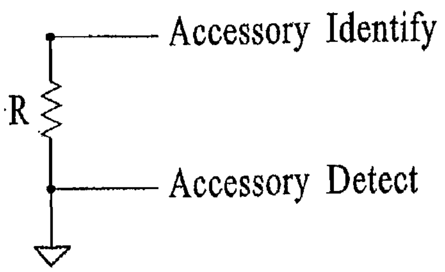

FIG.4C

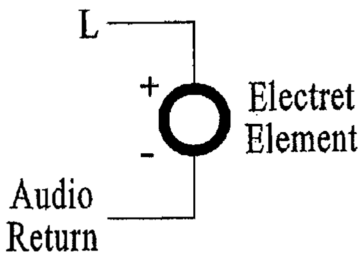

FIG.4D

METHOD AND SYSTEM FOR TRANSFERRING STORED DATA BETWEEN A MEDIA PLAYER AND AN ACCESSORY

CROSS-REFERENCE TO RELATED APPLICATIONS

This application is a continuation of U.S. application Ser. No. 11/439,494, filed May 22, 2006, now U.S. Pat. No. 7,634,605, issued Dec. 15, 2009, entitled "METHOD AND SYSTEM FOR TRANSFERRING STORED DATA BETWEEN A MEDIA PLAYER AND AN ACCESSORY," which is incorporated herein by reference in its entirety for all purposes.

FIELD OF THE INVENTION

The present invention relates generally to electrical devices and more particularly to electrical devices such as media players that communicate with accessory devices.

BACKGROUND OF THE INVENTION

A media player stores media assets, such as audio tracks or photos that can be played or displayed on the media player. One example of a media player is the iPod® media player, which is available from Apple Computer, Inc. of Cupertino, Calif. Often, a media player acquires its media assets from a host computer that serves to enable a user to manage media assets. As an example, the host computer can execute a media management application to manage media assets. One example of a media management application is iTunes®, version 6.0, produced by Apple Computer, Inc.

A media player typically includes one or more connectors or ports that can be used to interface to the media player. For example, the connector or port can enable the media player to couple to a host computer, be inserted into a docking system, or receive an accessory device. There are today many different types of accessory devices that can interconnect to the media player. For example, a remote control can be connected to the connector or port to allow the user to remotely control the media player. As another example, an automobile can include a connector and the media player can be inserted onto the connector such that an automobile media system can interact with the media player, thereby allowing the media content on the media player to be played within the automobile.

Currently, the connectors or ports of a media player are open for use so long as a compatible connector or port is utilized. Consequently, numerous third-parties have developed accessory devices for use with other manufacturers' media players. One difficulty is that since a media player communicates with a variety of accessories must store information retrieved from each of the accessory in the file format of the accessory. Conversely if an accessory stores information in the media player it must do so in a compatible manner.

Thus, there is a need for improved techniques to enable manufacturers of electronic devices to control the nature and extent to which accessory devices can be utilized with other electronic devices.

SUMMARY OF THE INVENTION

A method, system and connector interface for transferring stored data between a media player and an accessory is disclosed. The method and system comprises obtaining by one of the media player and the accessory a unique identifier for a particular file stored in the other of the media player and the accessory; and returning the unique identifier with the stored file data to the one of the media player and the accessory. The system and method includes utilizing the stored file by the one of the media player or the accessory.

In the method, system and connector interface in accordance with the present invention, accessories and media players are able to retrieve and store data utilizing an arbitrary format. This data is opaque to any protocol used by the media player and requires no parsing or interpretation. To provide this facility, a plurality of commands allows both media players and accessories to present a simple file system. The plurality of commands could be utilized in a variety of environments.

BRIEF DESCRIPTION OF THE DRAWINGS

FIG. 3A illustrates the connector pin designations for the docking connector.

FIG. 3B illustrates the connection pin designations for the remote connector.

FIG. 4B illustrates a reference schematic diagram for an accessory power source.

FIG. 4C illustrates a reference schematic diagram for a system for detecting and identifying accessories for the docking connector.

FIG. 4D is a reference schematic of an electret microphone that may be within the remote connector.

DETAILED DESCRIPTION OF THE INVENTION

The present invention relates generally to electrical devices and more particularly to electrical devices such as media players that communicate with accessory devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In a method and system in accordance with the present invention, accessories and media players are able to retrieve and store data utilizing an arbitrary format. This data is opaque to any protocol used by the media player and requires no parsing or interpretation. To provide this facility, a plurality of commands allows both media players and accessories to present a simple file system. The plurality of commands could be utilized in a variety of environments. One such environment is within a connector interface system environment such as described in detail hereinbelow.

Connector Interface System Overview

To describe the features of the connector interface system in accordance with the present invention in more detail, refer now to the following description in conjunction with the accompanying drawings.

Docking Connector

Figure 1A:
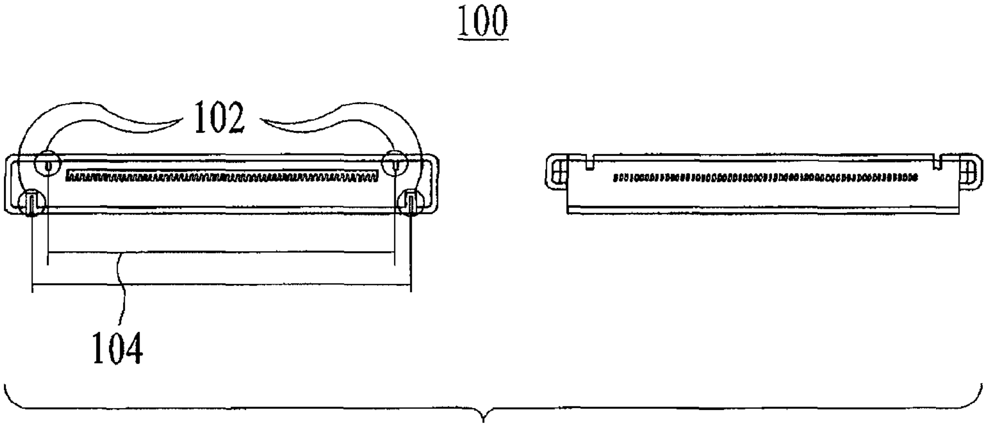
FIGS. 1A and 1B illustrate a docking connector in accordance with the present invention.
Figure 1B:
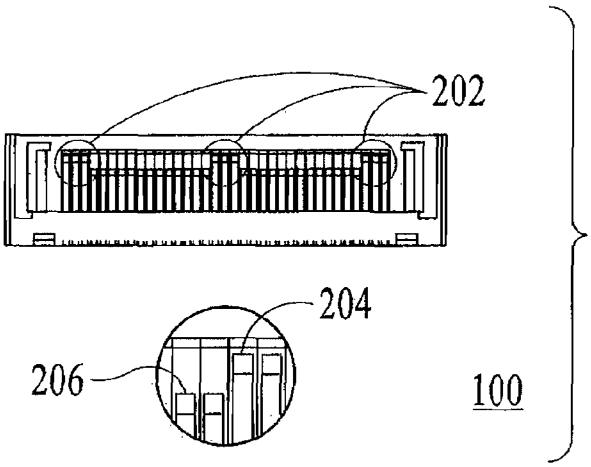

FIGS. 1A and 1B illustrate a docking connector 100 in accordance with the present invention. Referring first to FIG. 1A, the keying features 102 are of a custom length 104. In addition, a specific key arrangement where one set of keys are separated by one length are at the bottom and another set of keys are separated by another length at the top of the connector is used. The use of this key arrangement prevents noncompliant connectors from being plugged in and causing potential damage to the device. The connector for power utilizes a Firewire specification for power. The connector includes a first make/last break contact to implement this scheme. FIG. 1B illustrates the first make/last break contact 202 and also illustrates a ground pin and a power pin related to providing an appropriate first mate/last break contact. In this example, the ground pin 204 is longer than the power pin 206. Therefore, the ground pin 204 would contact its mating pin in the docking accessory before the power pin 206. Therefore internal electrical damage of the electronics of the device is minimized.

In addition, a connector interface system in accordance with the present invention uses both USB and Firewire interfaces as part of the same docking connector alignment, thereby making the design more compatible with different types of interfaces, as will be discussed in detail hereinafter. In so doing, more remote accessories can interface with the media player.

Remote Connector

Figure 2A:
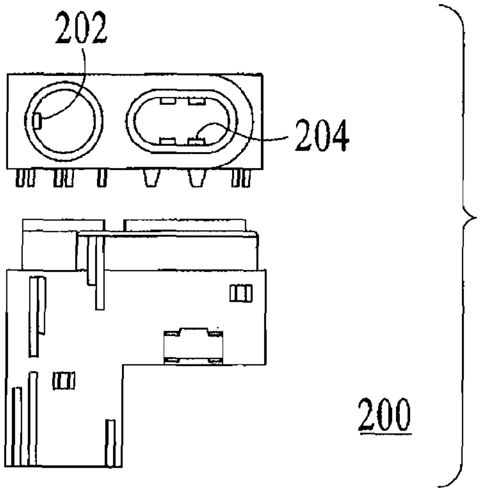
FIG. 2A is a front and top view of a remote connector in accordance with the present invention.
Figure 2B:
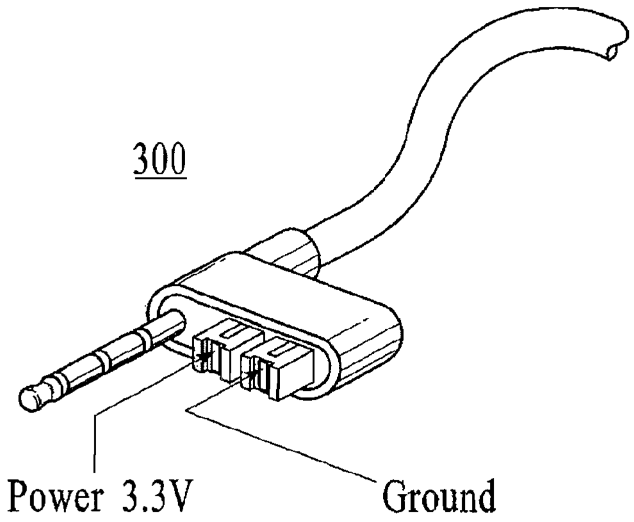
FIG. 2B illustrates a plug to be utilized in the remote connector.
Figure 2C:
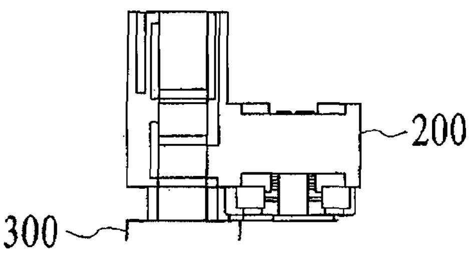
FIG. 2C illustrates the plug inserted into the remote connector.

The connection interface system also includes a remote connector which provides for the ability to output audio, input audio, provides I/O serial protocol, and to provide an output video. FIG. 2A is a front and top view of a remote connector 200 in accordance with the present invention. As is seen, the remote connector 200 includes a top headphone receptacle 202, as well as a second receptacle 204 for remote devices. FIG. 2B illustrates a plug 300 to be utilized in the remote connector. The plug 300 allows the features to be provided via the remote connector. FIG. 2C illustrates the plug 300 inserted into the remote connector 200. Heretofore, all these features have not been implemented in a remote connector. Therefore, a standard headphone cable can be plugged in but also special remote control cables, microphone cables and video cables could be utilized with the remote connector.

To describe the features of the connector interface system in more detail, please find below a functional description of the docking connector, remote connector and a command set in accordance with the present invention.

Docking and Remote Connector Specifications

For an example of the connector pin designations for both the docking connector and for the remote connector for a media player such as an iPod device by Apple Computer, Inc., refer now to FIGS. 3A and 3B. FIG. 3A illustrates the connector pin designations for the docking connector. FIG. 3B illustrates the connection pin designations for the remote connector.

Docking Connector Specifications

Figure 4A:
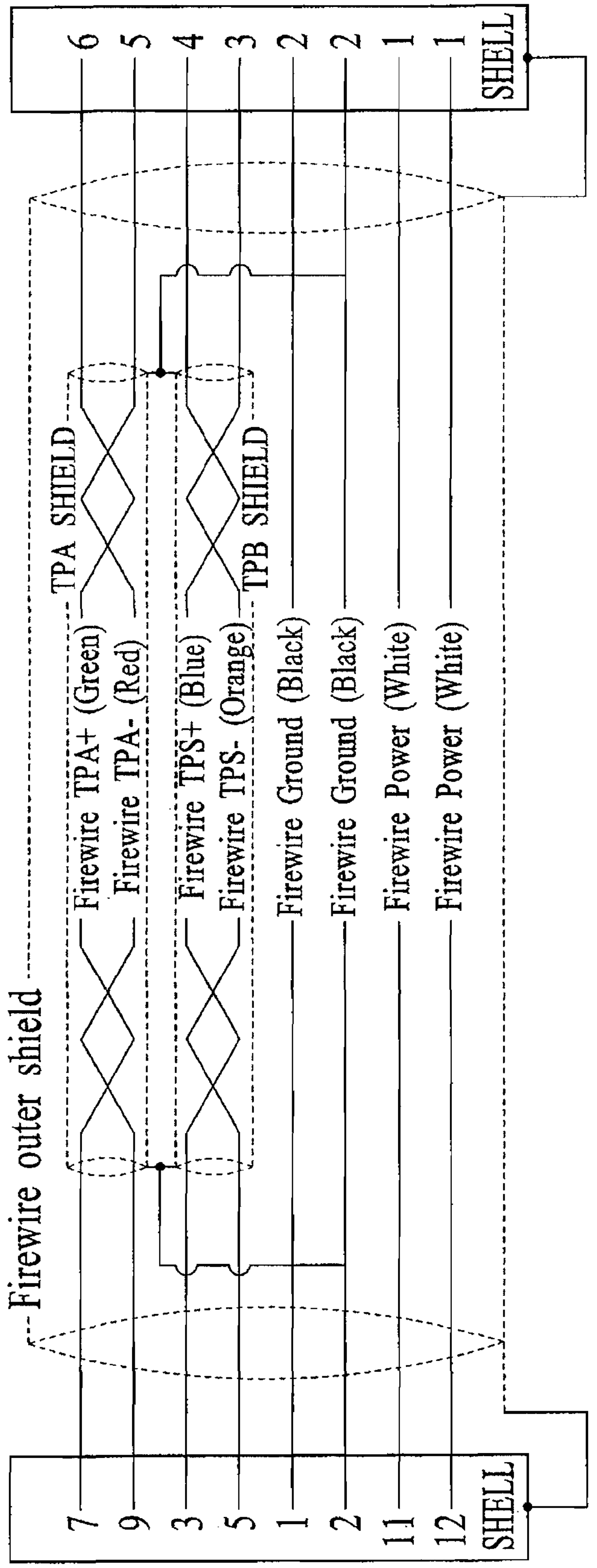
FIG. 4A illustrates a typical FireWire connector interface for the docking connector.

FIG. 4A illustrates a typical Firewire connector interface for the docking connector:

Firewire Power:

a) 8V-30V DC IN b) 10 W Max

Firewire:

a) Designed to IEEE 1394 A Spec (400 Mb/s)

USB Interface

The media player provides two configurations, or modes, of USB device operation: mass storage and media player USB Interface (MPUI). The MPUI allows the media player to be controlled using a media player accessory protocol (MPAP) which will be described in detail later herein, using a USB Human Interface Device (HID) interface as a transport mechanism.

Accessory 3.3 V Power

FIG. 4B illustrates the accessory power source. The media player accessory power pin supplies voltages, for example, 3.0 V to 3.3V±5% (2.85 V to 3.465 V) over the 30-pin connector and remote connector (if present). A maximum current is shared between the 30-pin and Audio/Remote connectors.

By default, the media player supplies a particular current such as 5 mA. Proper software accessory detect is required to turn on high power (for example, up to 100 mA) during active device usage. When devices are inactive, they must consume less than a predetermined amount of power such as 5 mA current.

Accessory power is switched off for a period of, for example, approximately 2 seconds during the media player bootstrap process. This is done to ensure that accessories are in a known state and can be properly detected. All accessories are responsible for re-identifying themselves after the media player completes the bootstrap process and transitions accessory power from the off to the on state.

Accessory power is grounded through the F/W GND pins.

FIG. 4C illustrates a reference schematic diagram for a system for detecting and identifying accessories for the docking connector. The system comprises:

a) A resistor to ground allows the device to determine what has been plugged into docking connector. There is an internal pullup on Accessory Identify.

b) Two pins required (Accessory Identify & Accessory Detect)

FIG. 4D is a reference schematic of an electret microphone that is within the remote connector.

Serial Protocol Communication:

a) Two pins used to communicate to and from device (Rx & Tx)

b) Input & Output (0V=Low, 3.3V=High)

Figure 5A:
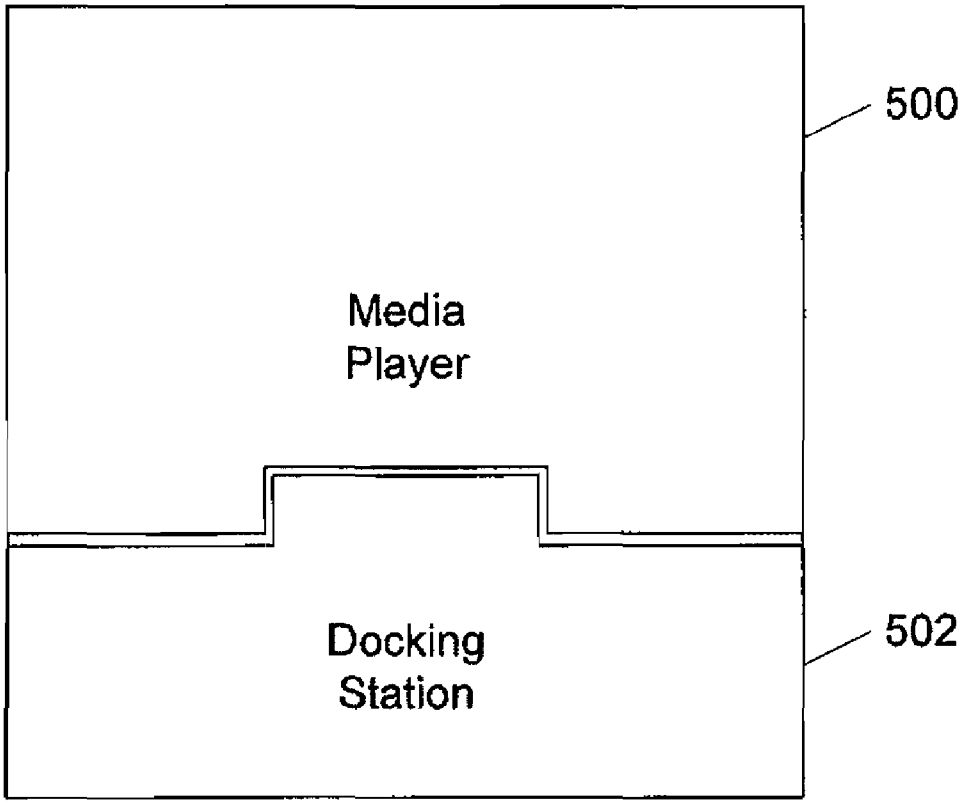
FIG. 5A illustrates a media player coupled to different accessories
Figure 5B:
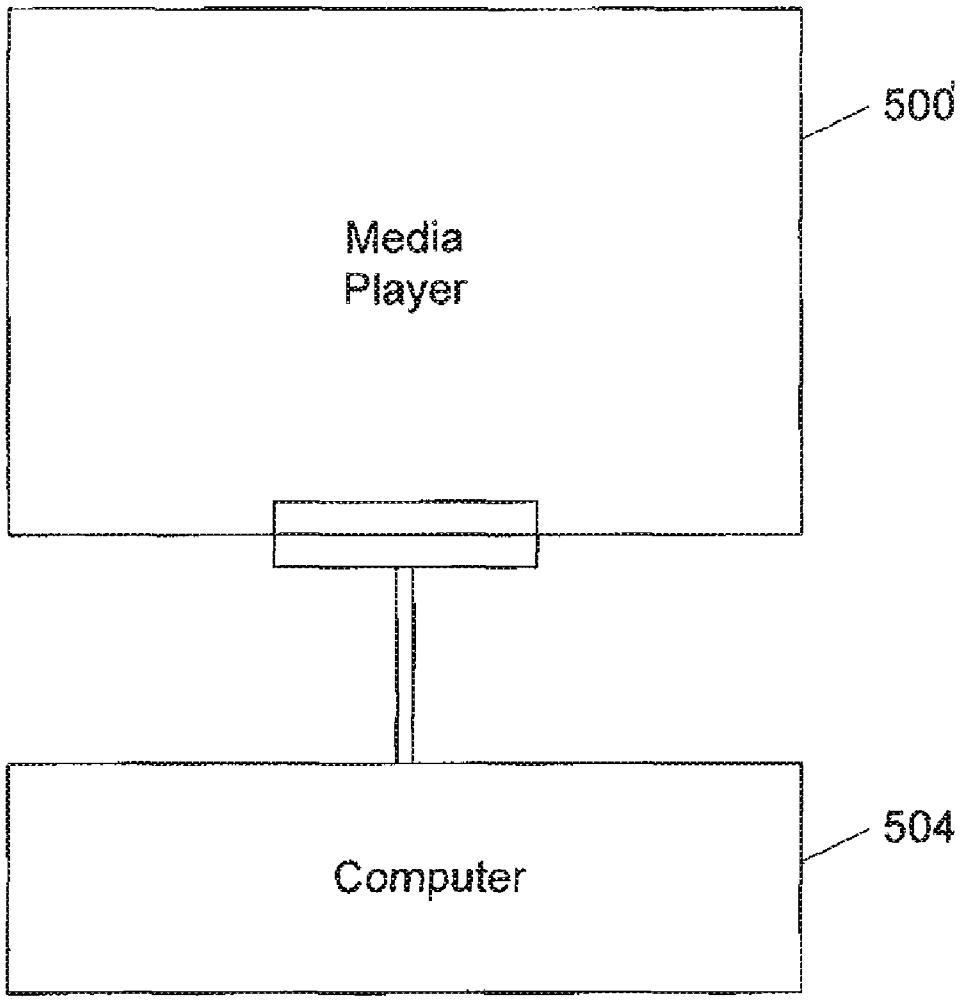
FIG. 5B illustrates the media player coupled to a computer.
Figure 5C:
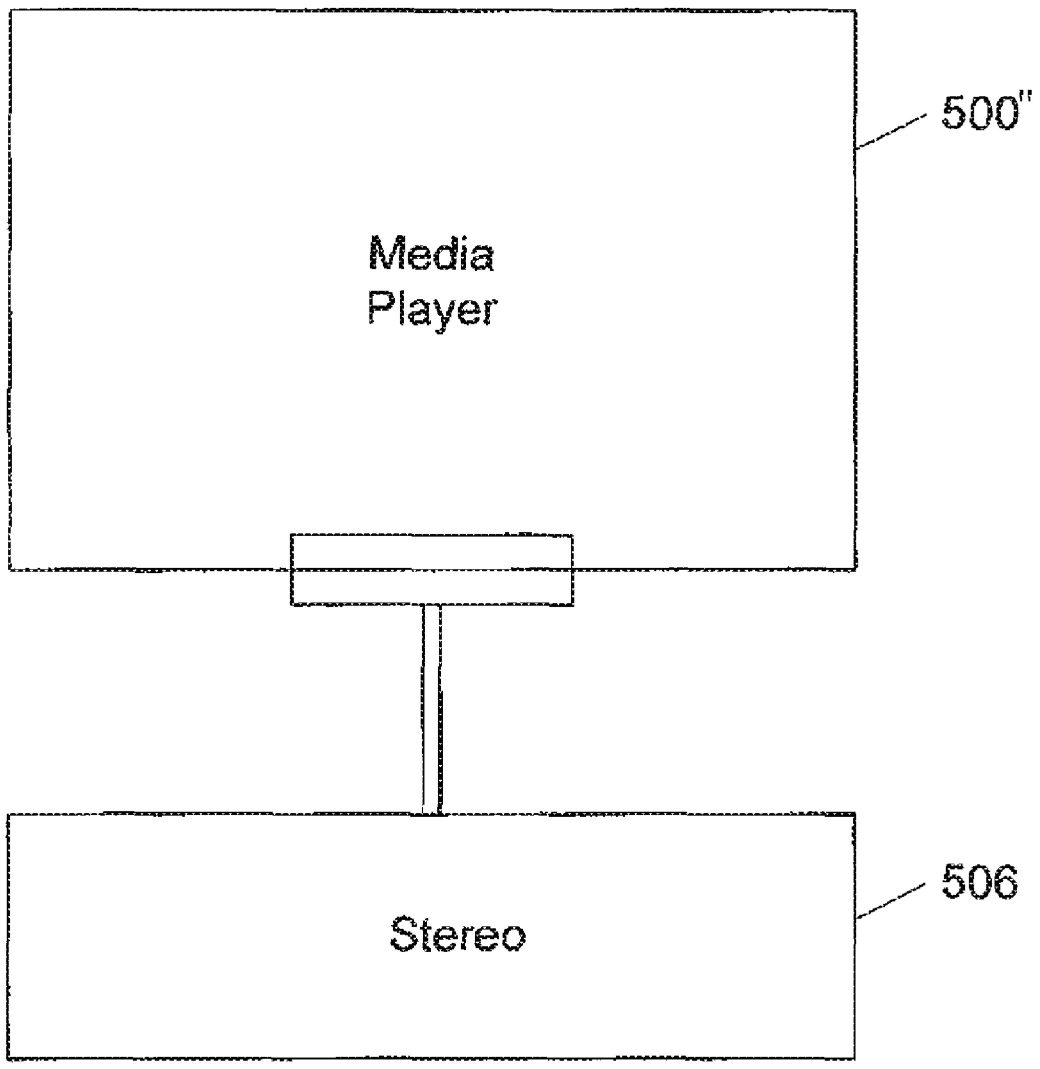
FIG. 5C illustrates the media player coupled to a car or home stereo system.
Figure 5D:
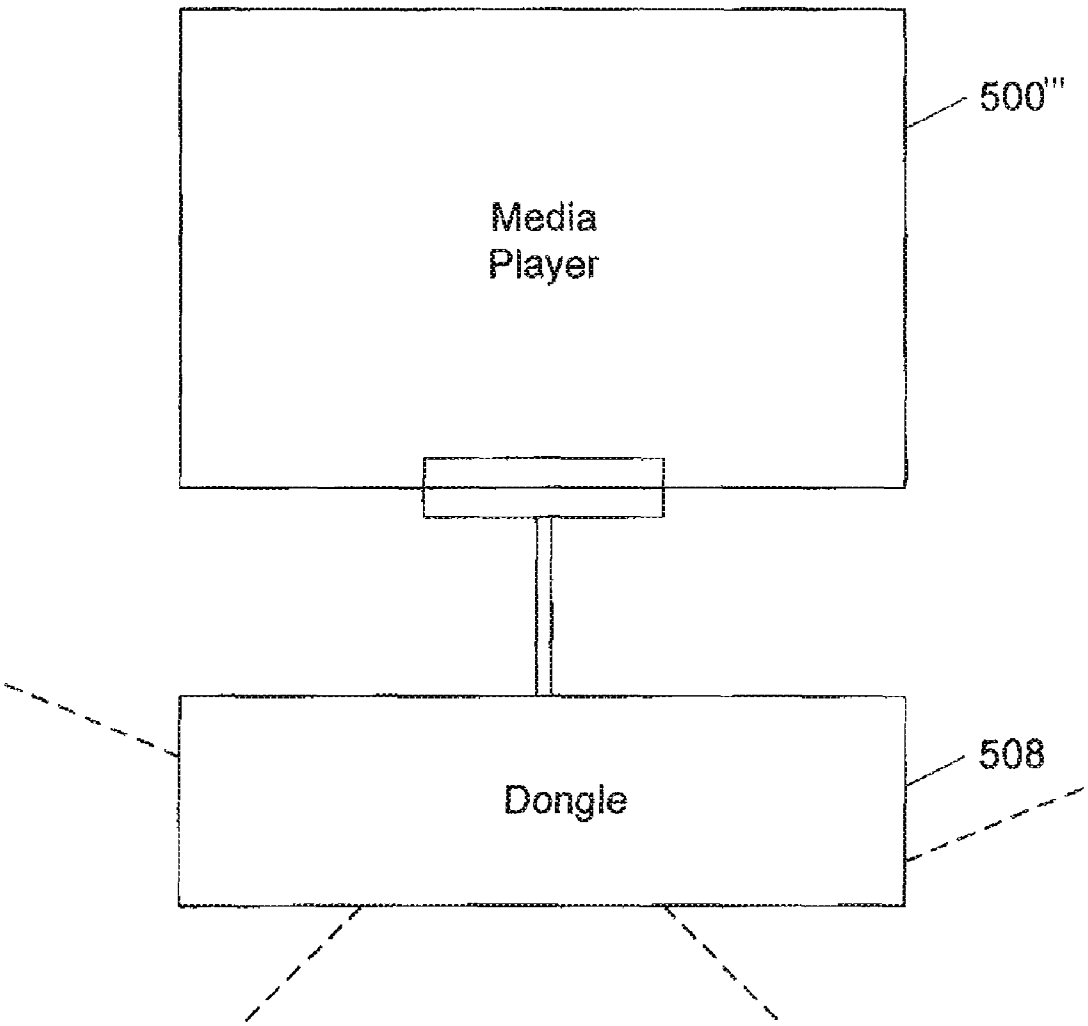
FIG. 5D illustrates the media player coupled to a dongle that communicates wirelessly with other accessories.
Figure 5E:
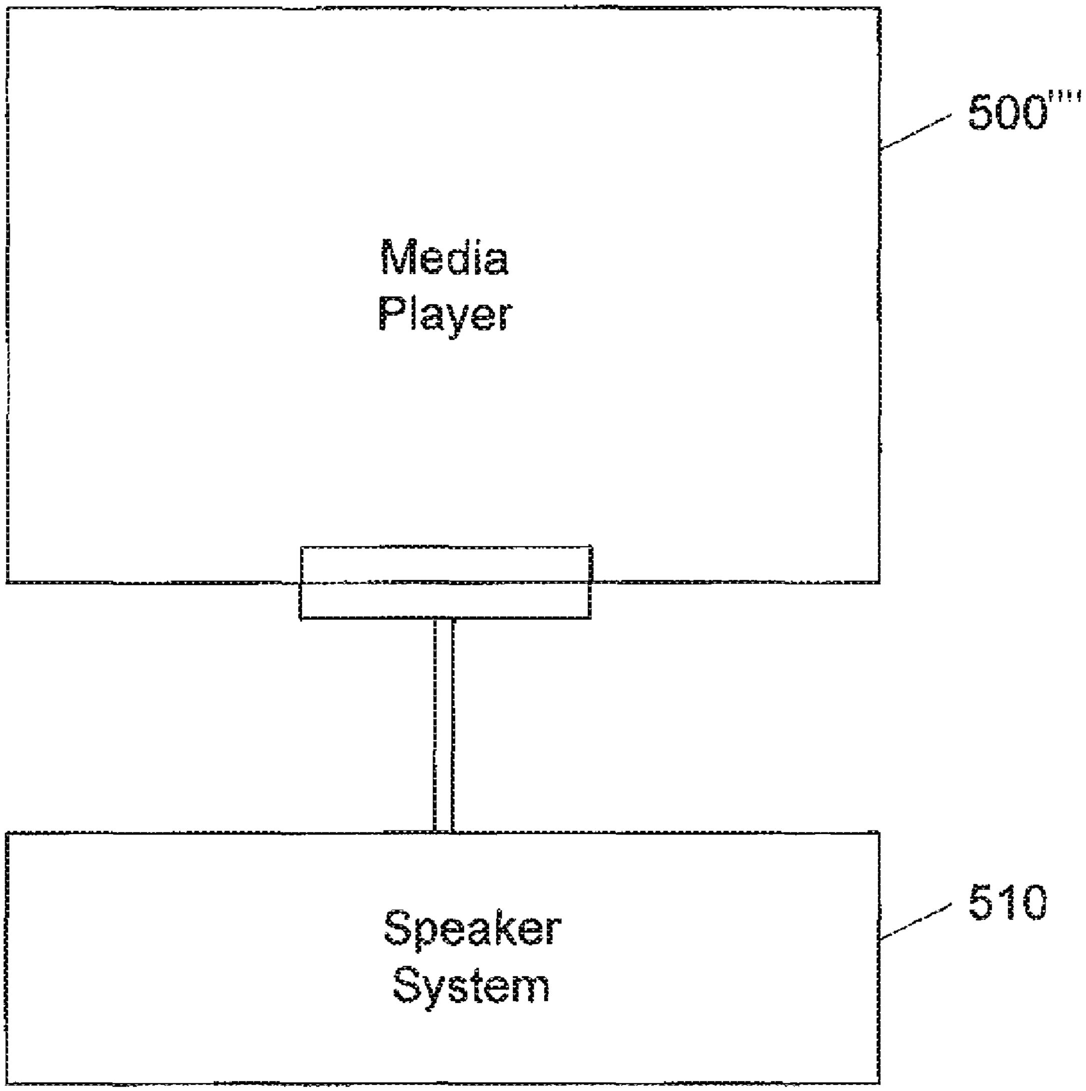
FIG. 5E illustrates the media player coupled to a speaker system.

As before mentioned, media players connect to a variety of accessories. FIGS. 5A-5E illustrates a media player 500 coupled to different accessories. FIG. 5A illustrates a media player 500' coupled to a docking station 502. FIG. 5B illustrates the media player 500" coupled to a computer 504. FIG. 5C illustrates the media player 500'" coupled to a car or home stereo system 506. FIG. 5D illustrates the media player 500"" coupled to a dongle 508 that communicates wirelessly with other devices. FIG. 5E illustrates the media player 500'"" coupled to a speaker system 510. As is seen, what is meant by accessories includes but is not limited to docking stations, chargers, car stereos, microphones, home stereos, computers, speakers, and accessories which communicate wirelessly with other accessories.

As before mentioned, this connector interface system could be utilized with a command set for allowing the transfer of storage data between a media player and an accessory. It should be understood by one of ordinary skill in the art that although the above-identified connector interface system could be utilized with the command set a variety of other connectors or systems could be utilized and they would be within the spirit and scope of the present invention. To describe the utilization of the command set in more detail refer now to the following description in conjunction with the accompanying Figure.

Figure 6:
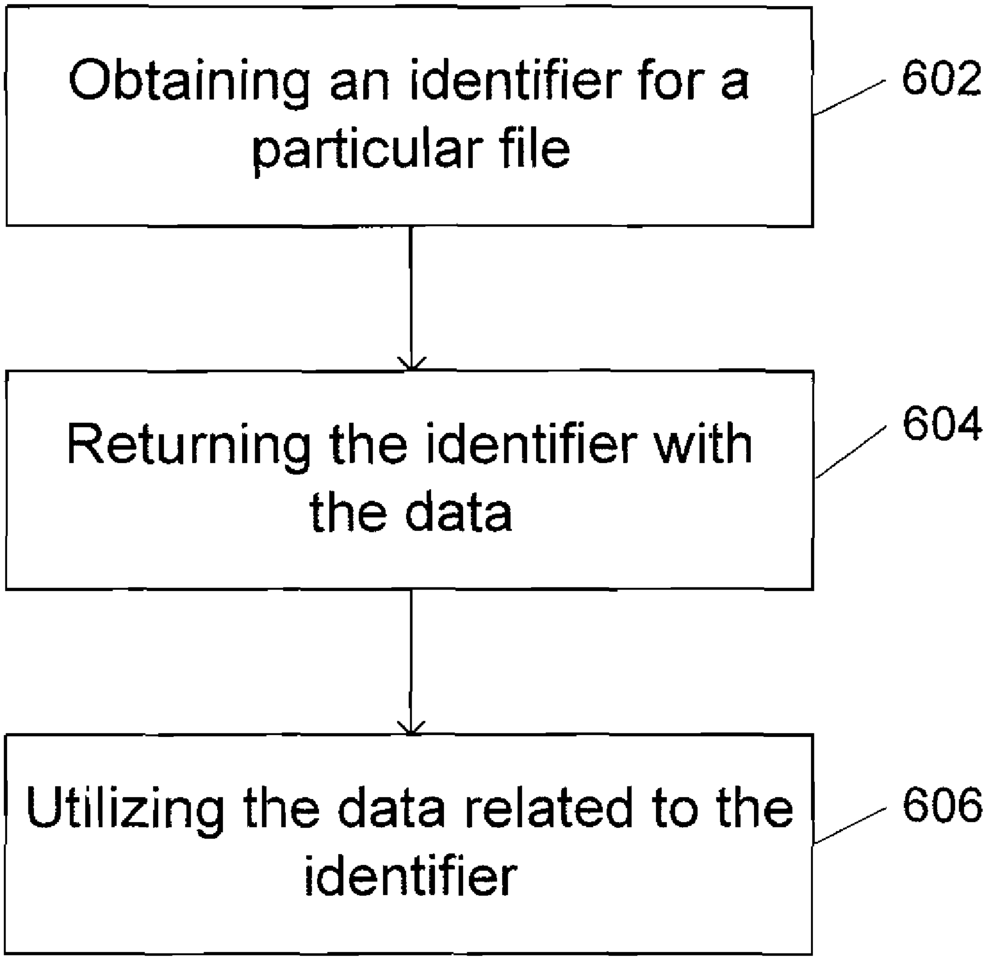
FIG. 6 is a flow chart which illustrates a process for allowing the transfer of data between a media player and an accessory.

FIG. 6 is a flow chart which illustrates the process for allowing the transfer of storage data between a media player and an accessory. As is seen, one of the accessory and the media player obtains a unique identifier for a particular file related to the other of the accessory and media player, via step 602. The identifier, for example, could be a unique file handle. Next, the unique identifier is returned to the one of the accessory or media player with the data associated with the identifier, via step 604. Finally, the data related to the identifier is utilized by the media player or the accessory, via step 606.

Based upon the commands utilized, this utilization can take many forms. For example, the data can be written by the media player or the accessory. In another example, the data could be read by the one of the media player or the accessory. In addition, the file can be closed after the data is read or written. In another example, data can be deleted after closing the file, or after the data is read or written depending on the environment. The following will describe in detail various commands which can be utilized to perform the process described hereinabove. In one embodiment for each command related to a media player, there is a reciprocal command for an accessory.

The commands for treating the media player as a file system are within a predetermined range of addresses. The parallel commands for treating an accessory as a file system are within a predetermined range of addresses. Typically if a particular command performs a specific operation on the media player file system, then a reciprocal command will perform the same operation on the accessory file system. In one embodiment commands are provided for allowing a media player and an accessory to transfer and store data.

Command Functionality

Although a plurality of commands is described hereinbelow, one of ordinary skill in the art recognizes that many other commands could be utilized and their use would be within the spirit and scope of the present invention. Accordingly, the list of commands below is representative but not exhaustive of the types of commands that could be utilized to transfer and store data between a media player and an accessory. Furthermore, it is also readily understood by one of ordinary skill in the art that a subset of these commands could be utilized by a media player or an accessory and that use would be within the spirit and scope of the present invention. A description of the functionality of some of these commands is described below.

Commands for acknowledging the receipt of a storage command from either the accessory or the media player.

Commands for asking the media player or the accessory to return its storage capabilities.

Commands for telling the accessory or the media player about its storage capabilities. The storage capabilities include but are not limited to the following features:

1. Total space available on the destination.
2. Maximum file size.
3. Maximum write size.
4. Maximum name length for a file on directory.
5. File system type.
6. Version number.
7. Definition of capability such as read/only, read/write or support subdirectory.
8. Defines where writing can begin.
9. Support renaming of a file.
10. Support directory command send as change directory, create directory and delete directory.

Commands for requesting the media player or the accessory to return a unique identifier of a file. In one embodiment the unique identifier persists until the accessory or media player detaches or closes the file, whichever comes first.

Commands where the media player or accessory returns a handle to identify the file.

Commands where the accessory or media player asks for a chunk of data to be returned from a file. In one embodiment these commands may result in several commands, as needed to fulfill the request.

Commands for the media player or accessory to transmit the data in response to the command from the other.

Commands where the accessory or media player writes a block of data to a file of the media player or the accessory.

Commands for closing the file and releasing the unique identifier of the media player or the accessory.

Commands for deleting the named file from the media player or the accessory.

Commands for requesting the number of files and subdirectories in the specified directory of the media player or the accessory.

Commands for returning the number of files and subdirectories in the directory of the media player or the accessory.

Commands for obtaining the listing of the contents of the specified directory of the media player or the accessory.

Commands for obtaining the results of a directory listing of the media player or the accessory. In one embodiment, a separate command is returned for each directory entry.

Commands for obtaining the status of the specified file or directory of the media player or accessory.

Commands for obtaining the results of a call to a specified file or directory of the media player or the accessory.

Commands where the accessory or media player asks the other to return the amount of free space on its storage system of the media player or the accessory.

Commands where the accessory or media player tells the other the amount of free space on its storage system of the media player or the accessory.

A method and system in accordance with the present invention provides a plurality of commands that allow accessories and media players to retrieve and store data utilizing an arbitrary format. In so doing, a media player and accessory can obtain each others' stored data in an official manner. Since both the media player and accessory are utilizing the same arbitrary format neither has to determine the file format of the other.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method performed by a media player for transferring stored data between the media player and an accessory, the media player including a storage device for storing one or more files, the method comprising:

receiving, by the media player, a first command from the accessory, the first command requesting storage capability information indicating one or more storage capabilities of the storage device, wherein the storage capability information includes one or more of: maximum file size information, maximum write size information, maximum filename length information, or filesystem type information;

sending, by the media player, a second command to the accessory in response to the first command, the second command including the storage capability information;

receiving, by the media player, a third command from the accessory, the third command requesting a unique identifier for a file stored on the storage device;

sending, by the media player, a fourth command to the accessory in response to the third command, the fourth command including the unique identifier; and receiving, by the media player, a fifth command from the accessory in response to the fourth command, wherein the fifth command requests execution of a storage operation with respect to the file, and wherein the fifth command includes the unique identifier.

2. The method of claim 1 wherein the fifth command is a write command for writing data from the accessory to the file.

3. The method of claim 2 wherein the data is stored on a storage device of the accessory, and wherein subsequently to sending the fifth command, the data is deleted from the storage device of the accessory.

4. The method of claim 1 wherein the fifth command is a read command for reading data from the file to the accessory.

5. The method of claim 1 further comprising:

executing, by the media player, the storage operation with respect to the file in response to the fifth command.

6. The method of claim 1 further comprising:

receiving, by the media player, a sixth command from the accessory, the sixth command requesting closure of the file and release of the unique identifier.

7. The method of claim 1, further comprising:

receiving, by the media player, a sixth command from the accessory, the sixth command requesting deletion of the file.

8. The method of claim 1 further comprising:

sending, by the media player, a sixth command to the accessory in response to the fifth command, the sixth command acknowledging the fifth command.

9. The method of claim 1 further comprising:

receiving, by media player, a sixth command from the accessory, the sixth command requesting storage status information indicating a status of the storage device; and sending, by the media player, a seventh command to the accessory in response to the sixth command, the seventh command including the storage status information.

10. The method of claim 9 wherein the storage status information includes one or more of: total free space on the storage device, total number of files or file directories stored on the storage device, total number of files or subdirectories in a specified file directory, contents of a specified file directory, status of a specified file, or status of a specified file directory.

11. A method performed by a media player for transferring stored data between the media player and an accessory, the accessory including a storage device for storing one or more files, the method comprising:

sending, by the media player, a first command to the accessory, the first command requesting storage capability information indicating one or more storage capabilities of the storage device, wherein the storage capability information includes one or more of: maximum file size information, maximum write size information, maximum filename length information, or filesystem type information;

receiving, by the media player, a second command from the accessory in response to the first command, the second command including the storage capability information;

sending, by the media player, a third command to the accessory, the third command requesting a unique identifier for a file stored on the storage device;

receiving, by the media player, a fourth command from the accessory in response to the third command, the fourth command including the unique identifier; and sending, by the media player, a fifth command to the accessory in response to the fourth command, wherein the fifth command requests execution of a storage operation with respect to the file, and wherein the fifth command includes the unique identifier.

12. The method of claim 11 wherein the fifth command is a write command for writing data from the media player to the file.

13. The method of claim 12 wherein the data is stored on a storage device of the media player, and wherein subsequently to sending the fifth command, the data is deleted from the storage device of the media player.

14. The method of claim 11 wherein the fifth command is a read command for reading data from the file to the media player.

15. The method of claim 11 further comprising:

sending, by the media player, a sixth command to the accessory, the sixth command requesting closure of the file and release of the unique identifier.

16. The method of claim 11 further comprising:

sending, by the media player, a sixth command to the accessory, the sixth command requesting deletion of the file.

17. The method of claim 11 further comprising:

receiving, by the media player, a sixth command from the accessory in response to the fifth command, the sixth command acknowledging the fifth command.

18. The method of claim 11 further comprising:

sending, by the media player, a sixth command to the accessory, the sixth command requesting storage status information indicating a status of the storage device; and receiving, by the media player, a seventh command from the accessory in response to the sixth command, the seventh command including the storage status information.

19. The method of claim 18 wherein the storage status information includes one or more of: total free space on the storage device, total number of files or file directories stored on the storage device, total number of files or subdirectories in a specified file directory, contents of a specified file directory, status of a specified file, or status of a specified file directory.

20. A media player comprising:

a storage device for storing one or more files;

an interface adapted to be coupled with an accessory and configured to support a storage protocol for exchanging with the accessory commands and information related to the storage device; and a control module coupled to the interface, the control module being configured to:

receive from the accessory a first command requesting storage capability information indicating one or more storage capabilities of the storage device, wherein the storage capability information includes one or more of: maximum file size information, maximum write size information, maximum filename length information, or filesystem type information;

send to the accessory a second command in response to the first command, the second command including the storage capability information;

receive from the accessory a third command requesting a unique identifier for a file stored on the storage device;

send to the accessory a fourth command in response to the third command, the fourth command including the unique identifier; and receive from the accessory a fifth command in response to the fourth command, wherein the fifth command requests execution of a storage operation with respect to the file, and wherein the fifth command includes the unique identifier.

21. The media player of claim 20 wherein the interface comprises a connector having a plurality of signal pins, the signal pins being arranged to mate with corresponding signal pins on a mating connector of the accessory.

22. The media player of claim 21 wherein the plurality of signal pins includes a pair of serial pins and wherein the second and fourth commands are sent via a transmit pin of the pair of serial pins.

23. The media player of claim 22 wherein the plurality of signal pins further includes:

a ground pin and a power pin adapted such that the ground pin makes contact with a corresponding ground pin in the mating connector of the accessory before the power pin makes contact with a corresponding power pin in the mating connector of the accessory;

a Firewire signal pin;

a USB signal pin;

a USB power pin;

an accessory identify signal pin;

an accessory detect signal pin;

a video output pin;

an accessory power pin;

a remote sense signal pin; and a line signal pin.

24. The media player of claim 21 wherein the connector comprises a keying arrangement, and wherein one set of keys are separated by one length and another set of keys are separated by another length.

* * * * *